United States Patent
Maddalena et al.

[15] 3,703,884
[45] Nov. 28, 1972

[54] AUTOMATED DAIRY BARN MILK STALL

[72] Inventors: Richard E. Maddalena, 2494 "I" Street; Edward J. Maddalena, 915 "I" Street, both of Petaluma, Calif. 94952

[22] Filed: April 21, 1970

[21] Appl. No.: 30,470

[52] U.S. Cl.................................119/27, 119/14.03
[51] Int. Cl.................................................A01j 1/00
[58] Field of Search............119/27, 96, 14.03, 14.04; 17/1

[56] References Cited

UNITED STATES PATENTS

| | | | |
|---|---|---|---|
| 2,904,005 | 9/1959 | Mielke et al. | 119/96 |
| 3,024,766 | 3/1962 | Eveland | 119/96 |
| 3,166,044 | 1/1965 | Darling | 119/27 |
| 3,246,631 | 4/1966 | Holm | 119/14.03 |
| 3,448,725 | 6/1969 | Holm et al. | 119/27 |
| 3,460,515 | 8/1969 | Page et al. | 119/14.04 |
| 3,487,497 | 1/1970 | Jorgensen et al. | 17/1 |
| 3,536,045 | 10/1970 | Flocchini | 119/27 |

Primary Examiner—Aldrich F. Medbery
Attorney—Flehr, Hohbach, Test, Albritton & Herbert

[57] ABSTRACT

A dairy barn for automatically processing cows for milking. Individual cows are moved from a herd in a holding area serially into a wash stall, a prep stall, a runway, one of a plurality of milk stalls, and an exit passageway. The cows are moved from station-to-station automatically responsive to pre-set control functions and cow movement. Memory controls are provided to insure that every cow directed to a milk stall has gone through a complete wash and prep cycle. The memory controls are also designed to keep the milk stalls loaded with "unmilked" cows. For example, where cows are let out of two milk stalls in the same milking line, the wash and prep stalls will automatically process two additional cows which are in turn released to these milk stalls. The operation is automatic in that the only action required by the operator is in releasing the milked cows from the milk stalls. When each cow is milked and leaves its milk stall, the control system automatically advances a washed and preped cow into this stall, advances a washed cow into the prep stall, and advances a cow from the holding area into the wash stall. Each milk stall is adapted to position the cow in an optimum relationship for milking with respect to an operator's walkway, and pusher gates are provided to operate when the milk stall is opened for urging the cow to leave the milk stall by itself.

4 Claims, 14 Drawing Figures

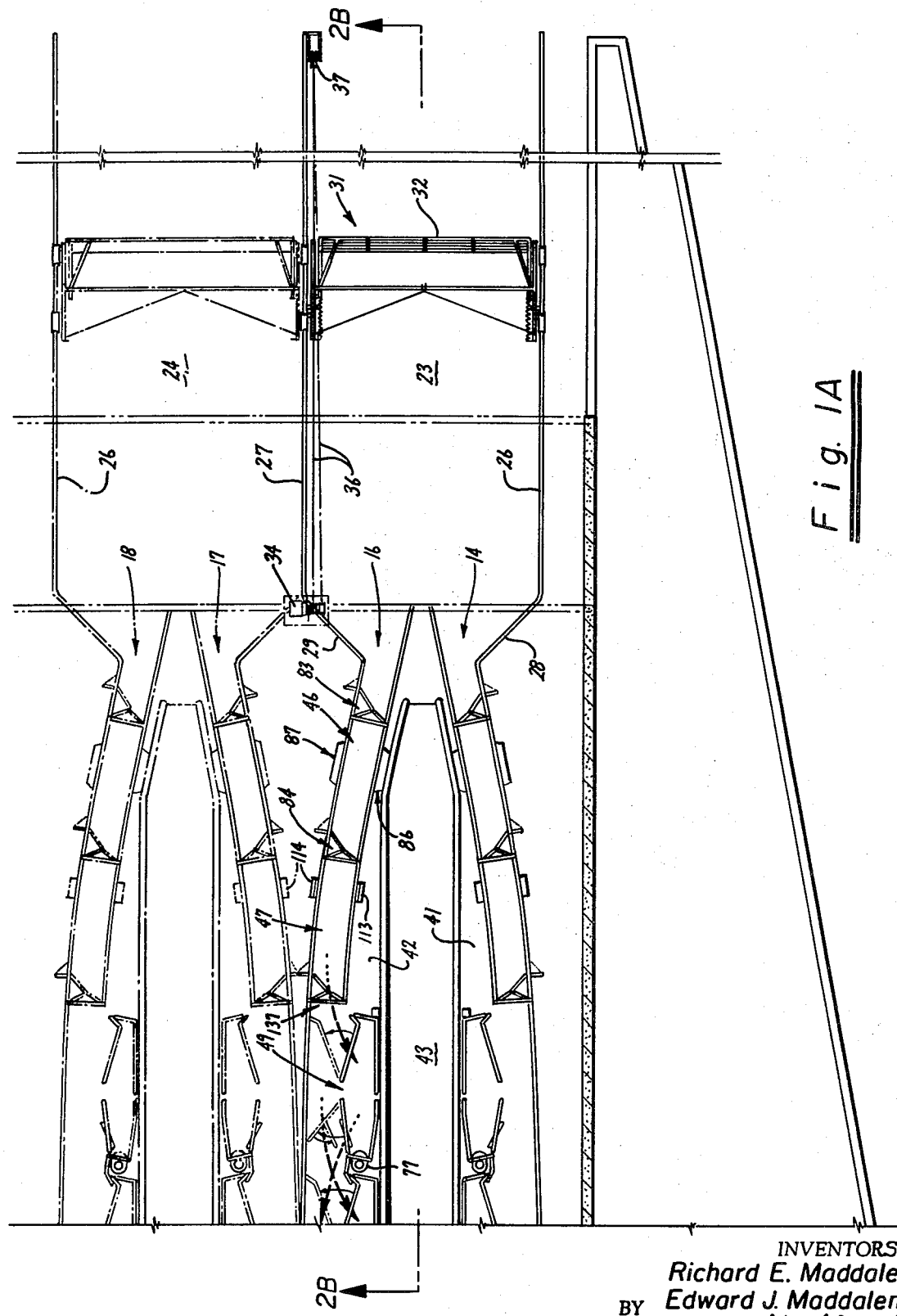

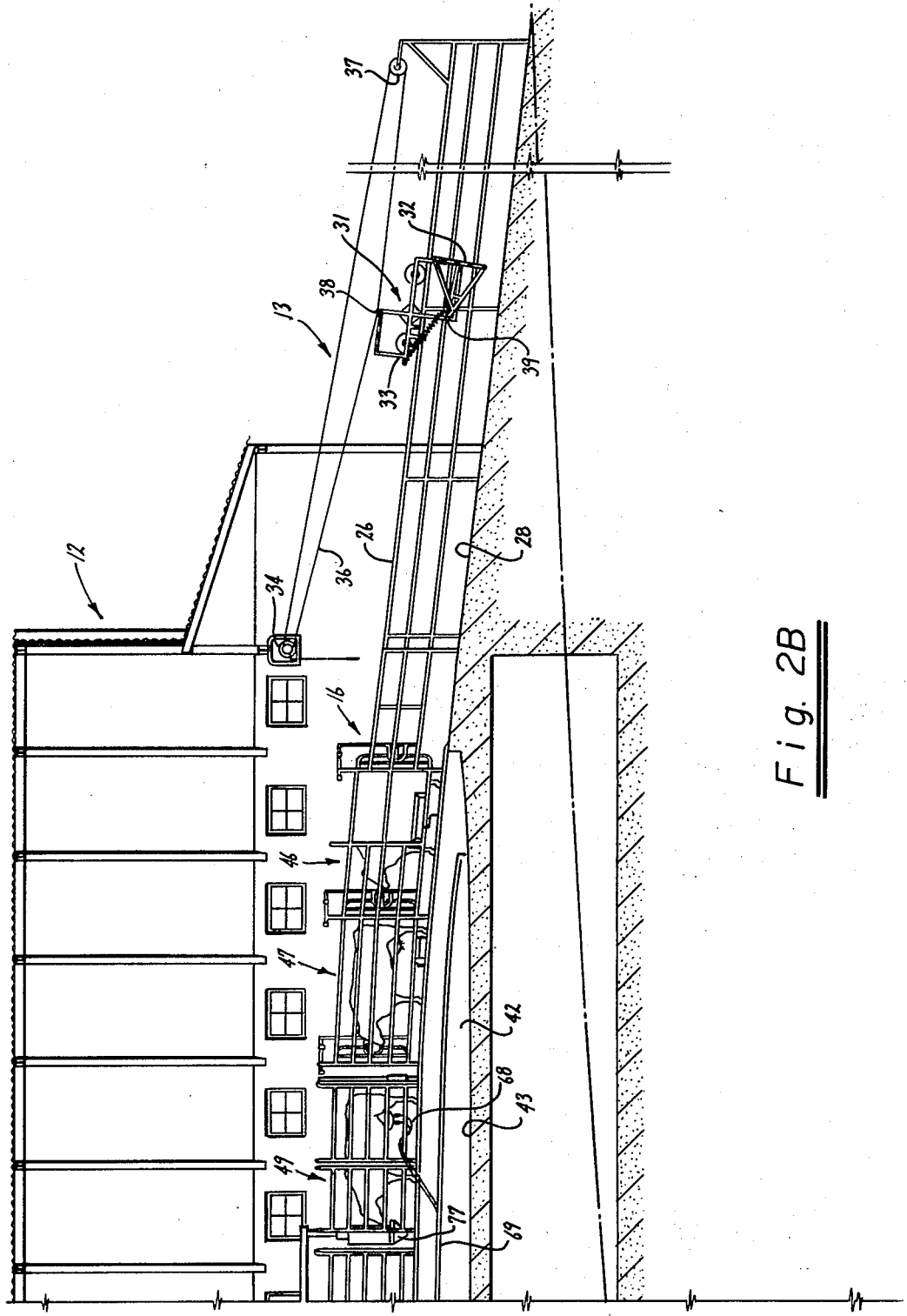

INVENTORS
Richard E. Maddalena
BY Edward J. Maddalena
Flehr, Hohbach, Test,
Albritton & Herbert
Attorneys

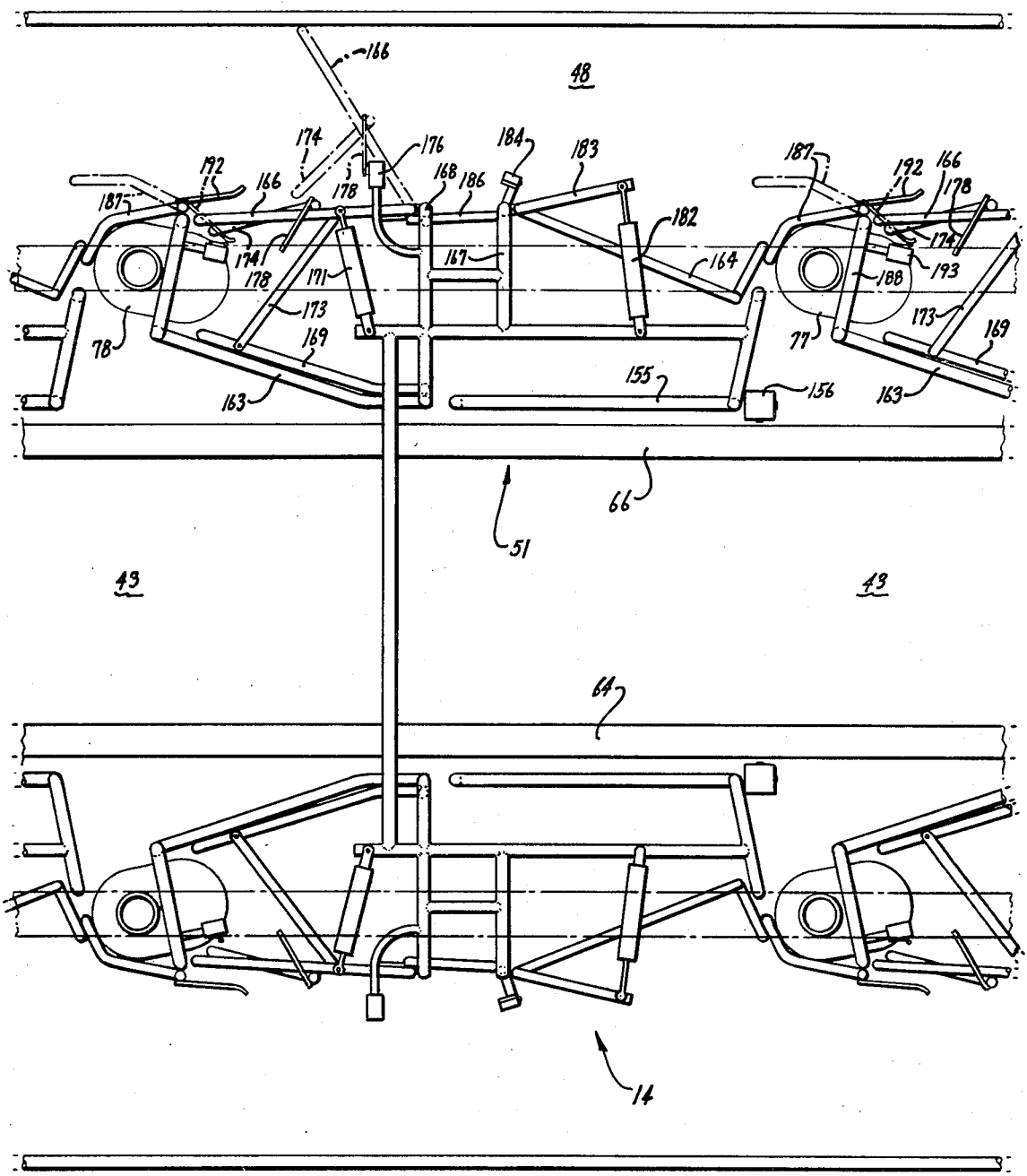

AUTOMATED DAIRY BARN MILK STALL

BACKGROUND OF THE INVENTION

The dairy industry has sought to provide increased efficiency in the handling and milking of dairy cows. At the present time a great deal of labor is required in milking a dairy herd, and this limits the efficiency of the milking operation. Multiple milk stall dairy barns have been provided for simultaneous milking of a number of cows by a few operators. However, many of the operations such as washing, preping, drying, and herding the cows into and out of the various stalls limits the number of cows which can effectively be handled by these operators. Accordingly, the need has been recognized for a dairy barn system of improved efficiency, which is automatic in operation, and which reduces the manpower requirements.

SUMMARY AND OBJECTS OF THE INVENTION

It is a general object of the invention to provide an automated dairy barn system affording increased efficiency in milking a herd of dairy cows.

Another object is to provide a dairy barn system which increases cow handling capacity by reducing manpower requirements.

Another object is to provide a dairy barn system in which the dairy cows are progressed through wash, prep, and milking stations in automatic, cow-operated sequence.

Another object is to provide a dairy barn system in which dairy cows are moved through a series of stalls in a manner which does not frighten the animals and thereby provides better contentment for increased milk production.

Another object is to provide an automatic dairy barn system in which cows are sequenced from station-to-station by means of a control system with memory circuits insuring that every cow directed to a milk stall has been properly washed and preped.

Another object is to provide a dairy barn system with a series of wash, prep, and milk stalls separated by gates functioning to close only after a cow passes through a gate to the next stall so that the animal is not trapped and frightened by a prematurely closing gate.

Another object is to provide a milk stall having an exit gate and pusher gate on either side of a feed manger in the stall and with the pusher gate moving upon opening of the exit gate to urge the cow's head from the manger tending to create a curvature in the animal's spine so that she is encouraged to leave the stall without prodding from the operator.

Another object is to provide a milk stall arranged in relationship to an operator's walkway in a manner facilitating the milking operation.

The foregoing objects are provided by the automatic dairy barn system of the present invention in which the cows are sequenced through the various stations according to a predetermined program. Cows from the herd in a holding area are serially moved through wash and prep stalls and then into a runway leading to a plurality of milk stalls. The control system opens and closes various control gates for directing the cows from station-to-station in a cow-operated manner. Memory circuits are provided to insure that each cow directed to a milk stall has been properly washed and preped, and the circuit also insures that as a milk stall is emptied the next cow to be milked is released from the prep stall into the runway for delivery to this milk stall. Each milk stall is positioned in relationship to the operator's walkway for convenient access to the cow's udder. A pusher gate is mounted for conjoint operation with the front exit gate for removing the cow's head from its feed manger and tending to curve the animal's spine for encouraging it to leave the milk stall by itself. A spring loaded arm operates upon opening of the front exit gate to press against the animal's side for urging it to leave the milk stall.

BRIEF DESCRIPTION OF THE DRAWINGS

FIGS. 1A and 1B are a fragmentary top plan view of a dairy barn system according to the invention with the roof portion thereof removed for clarity;

FIGS. 2A and 2B are a side elevation section view taken along the line 2—2 of FIGS. 1A and 1B;

FIG. 11 is a top plan section view taken along the line 11—11 of FIG. 9 showing a pair of milk stalls on either side of the operator's runway; and, FIG. 12 is a schematic diagram of the control system for the invention.

DETAILED DESCRIPTION OF THE PREFERRED EMBODIMENTS

Figure 1B:
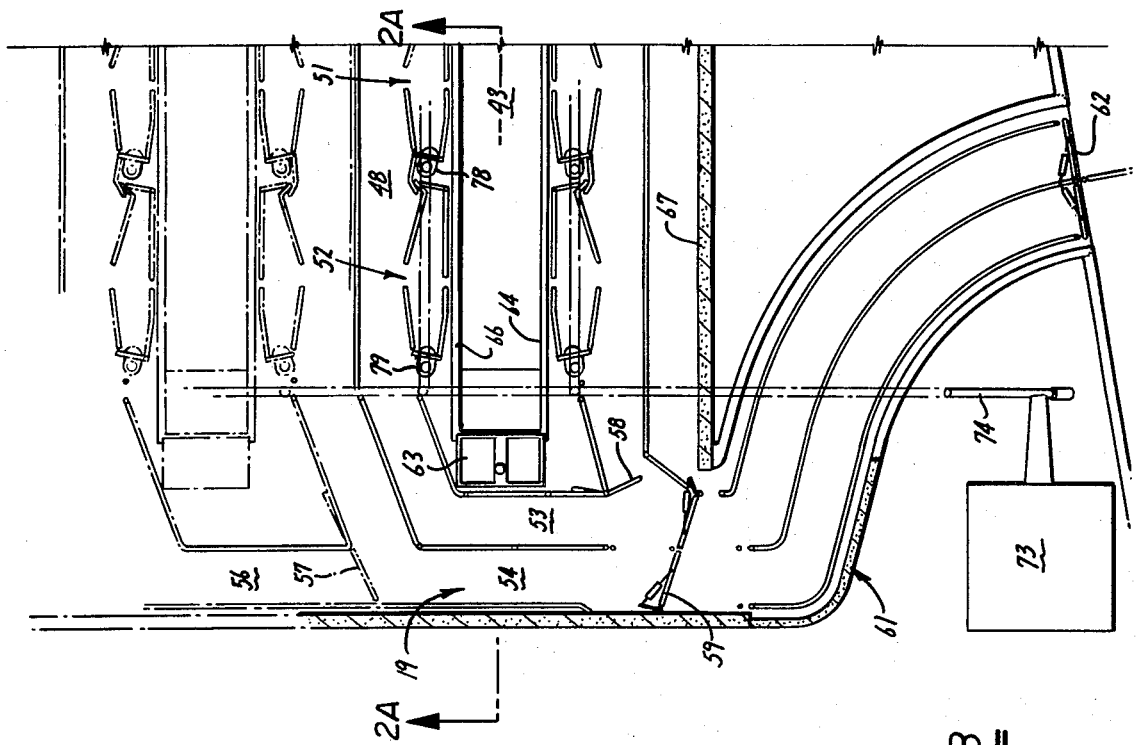

Referring now to the drawings and particularly FIGS. 1A, 1B, 2A, 2B, and 3, a preferred form of the automatic dairy barn system according to the invention is illustrated generally at 12. Dairy barn system 12 includes a holding station 13 where the cows to be milked are first herded together, a series of four milking lines 14, 16, 17 and 18, and exit runway area 19, and a roofed enclosure 21. The dairy barn is built on a suitable concrete foundation 22 forming the work area floor for both the cows and milking operators.

The exemplary dairy barn 12 is illustrated as having a twelve milk stall capacity. Holding station 13 includes a pair of side-by-side herd enclosures 23, 24 each feeding two of the milking lines, and each milking line is shown as including three milk stalls. It is understood that the number of herd enclosures for a particular barn, the number of milking lines leading off from each enclosure, and the number of milk stalls in each milking line can be enlarged or reduced in accordance with the desired milking capacity.

Enclosure 23 for holding station 13 will now be described, and it is understood that this description has equal application to that of enclosure 24. Enclosure 23 is defined by a pair of side fences 26, 27 built on an upwardly inclined concrete surface 28 leading to the milking lines. Enclosure 23 is open at its lower end for permitting the cows to enter from their pasture area. The forward end of enclosure 23 defines a pair of funnel-shaped guideways 28, 29 for directing the cows one at a time into either of the milking lines 14, 16. A crowding device 31 is provided to urge the herd forwardly for entry into the milking lines. This crowding device may comprise a fence-like railing 32 pivotally mounted on a trolley 33 adapted for traversing the length of enclosure 23 by means of wheels riding on side fences 26, 27. The trolley is traversed by means of electric motor 34 reversably driving a cable 36 trained over idler pulley 37 and attached to the trolley at 38.

With the herd in the enclosure, railing 32 of the crowding device is pivoted downwardly to the illustrated position. When it is desired to move the herd forward, crowding device 31 is traversed forwardly through operation of motor 34 so that the fence urges against the animals. For returning the crowding device, fence 32 is pivoted upwardly about pivot point 39 so that it is raised above any cows which may be herded in behind the fence. The crowding device is then moved back down the incline behind these cows and the fence again lowered.

Milking lines 14 and 16 will now be described, and it is understood that this description applies equally to milking lines 17 and 18. The milking lines extend the length of the dairy barn and are constructed above downwardly inclined concrete platforms 41, 42. These platforms are spaced apart on either side of a depressed operator's walkway 43 which is accessible by means of steps 44. The platforms are raised from this walkway a height sufficient to provide convenient access for attaching the milking machines to the cows.

Figure 3:
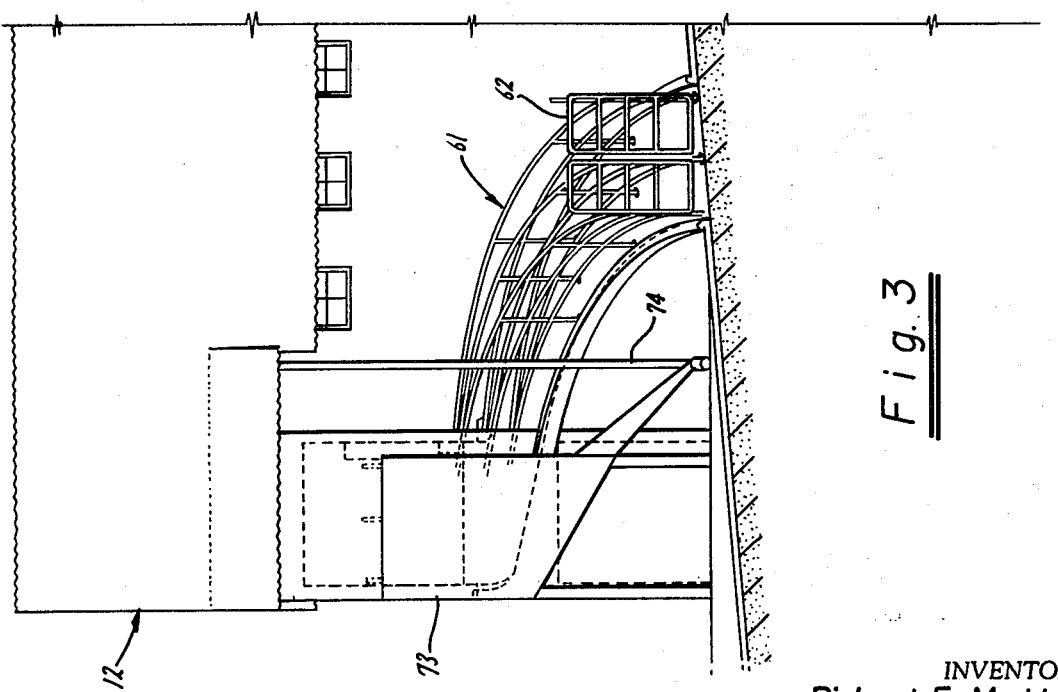
FIG. 3 is a fragmentary side elevation view of the dairy barn.

Milking line 16 is exemplary of the four milking lines and comprises a wash stall 46 leading from the holding station guideway 29, prep stall 47 in line with the wash stall, runway 48 in line with the prep stall, and a plurality of milk stalls 49, 51 and 52 on a side of the runway. The downstream end of runway 48 opens to exit runway 19. The exit runway includes a pair of chutes 53, 54 leading from respective milking lines 16 and 17. A chute 56 leads the milked cows from milking line 18 into the runway, and a gate 57 may be provided for purposes of controlling cow movement down this runway. Similarly, a gate 58 may be provided at the downstream end of milking line 14 for controlling cow movement therefrom into the exit runway, and a gate 59 may be provided at the end of the exit runway to control cow movement onto laned exit ramp 61. A control gate 62 may be provided at the end of the exit ramp, as best illustrated in FIG. 3, to control cow movement from the exit ramp into the pasture area.

A large volume flush tank 63 is provided above the exit runway platform between the ends of the milking lines 14, 16. The flush tank contains water which may be released for cleaning the milking line platforms 41, 42 of debris or offal. The water courses down the incline of the platforms in the path defined by curbing 64, 66 along walkway 43, wall 67 of the barn, and the curbing between adjacent milking line 17.

FIG. 2B illustrates the dairy barn with a cow in each of the wash stall 46, prep stall 47, and first milk stall 49. A conventional milking apparatus 68 is shown attached to the cow in milk stall 49 with the milk being directed through suitable tubing 69 and pumping apparatus 71 into milk holding station 72.

Feed is supplied to the feed mangers in each of the milk stalls from a feed storage hopper 73 located outside of the barn. A conveyor 74 moves the feed upwardly from the hopper for delivery to a plurality of branch conveyors 76 extending along and above respective milking lines. Conveyor 76 delivers the feed downwardly into feed hoppers 77, 78 and 79 mounted at the forward end of respective milk stalls 49, 51 and 52.

Figure 4:
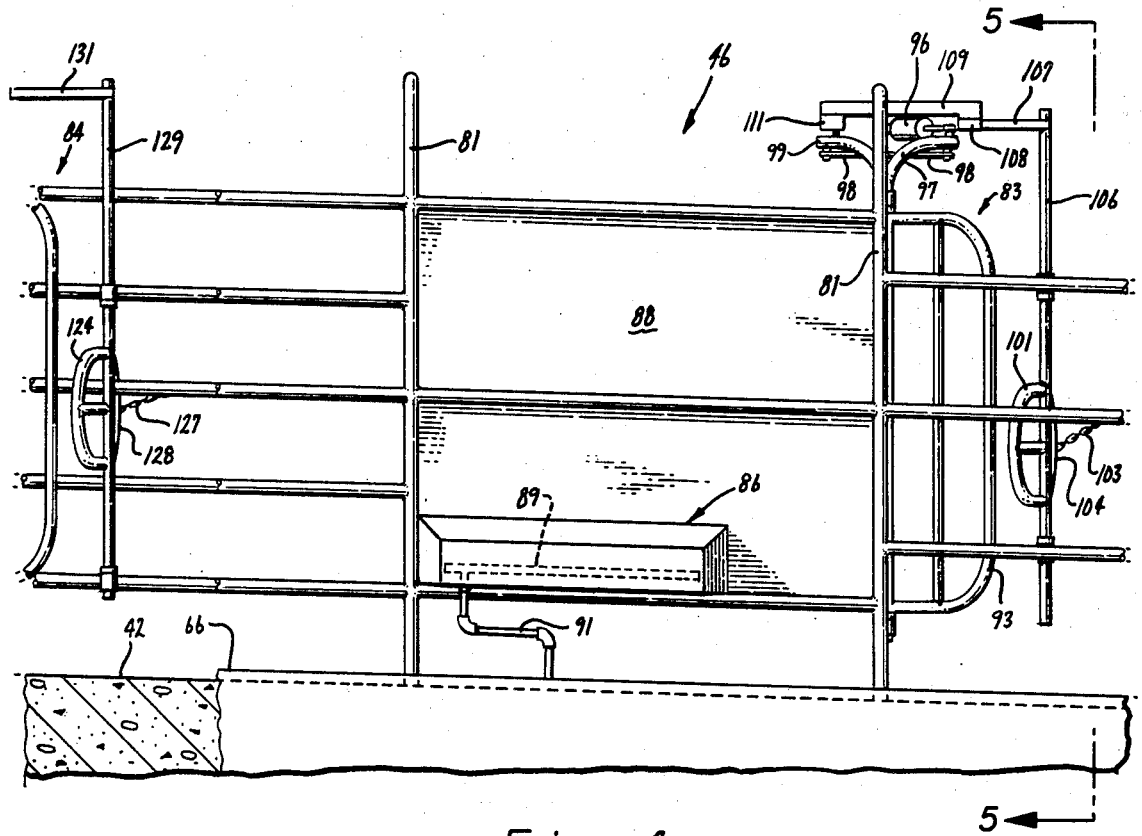
FIG. 4 is a side elevation view of a typical wash stall in the dairy barn system.
Figure 5:
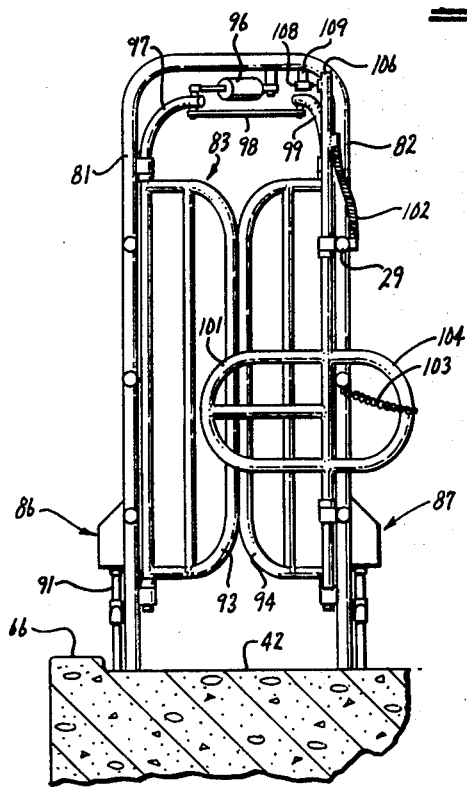
FIG. 5 is an end elevation section view of the wash stall taken along the line 5—5 of FIG. 4.

Referring to FIGS. 4 and 5 wash stall 46 of milking line 16 is illustrated in greater detail. The wash stall defines an enclosure for retaining a cow received from the holding station for washing the mud and dirt from the cow's udder. The side walls 81, 82 of the wash stall comprise a grid or framework of welded pipe with the lower ends of the supporting loops embedded in the concrete of platform 42. A rear entry gate 83 controls cow movement from holding station 13 into the wash stall, and middle gate 84 controls cow movement from the wash stall into the prep stall. A pair of water spray devices 86, 87 are provided on either side of the wash stall to direct a spray of water onto the cow's udder for a predetermined time under influence of the control circuit of FIG. 11. A pair of sheet metal shields 88 are mounted on the wash stall sides for retaining the water spray within the stall area. Water is supplied to sprinklers 89 of the water spray devices through piping 91, 92 connected with any available water supply system, or with an auxiliary pump, not shown, as desired.

Rear entry gate 83 for the wash stall comprises a pair of gate arms 93, 94 of welded pipe construction mounted to either side of the wash stall for pivotal movement between the rearwardly angling closed position of FIGS. 4 and 5 and an open position permitting a cow to enter the stall from the holding station. The gate arms are actuated between the open and closed positions by means of a suitable actuator 96 which is preferably of the pneumatic type, although it could be a hydraulic actuator or electric motor also. Actuator 96 is pivotally connected with an upwardly extending arcuate extension 97 of gate arm 93, and a connecting rod 98 interconnects movement of gate arm 93 with that of arm 94 through the latter's upwardly and rearwardly projecting extension 99. Gate 83 is opened when actuator 96 extends so that both gate arms conjointly swing outwardly.

A control flapper 101 is mounted to the welded piping defining the sides of guideway 29 leading to the wash stall. A suitable coil spring 102 is provided to urge flapper 101 counter-clockwise when viewed from above, and a chain 103 is secured between outer extension 104 of the flapper and guideway 29 so that the flapper normally projects into the path of a cow moving along the guideway through the open gate and into the wash stall. Cow movement along this path operates the flapper for cycling the control circuit of FIG. 12. An upwardly projecting integral extension 106 of flapper 101 is provided with an arm 107 adapted to move in registry with a switching device 108 mounted on a bracket 109 of the wash stall. Switch device 108 may be of the limit switch type and is positioned in relationship to flapper arm 107 so that it is actuated only after a cow passes by the flapper 101 and rear gate 83. As the cow releases flapper 101 it will swing to the closed position by the action of spring 102. When the flapper movement is stopped by chain 103 the inertia of arm 107 will carry its end to an overtravel position for contact with switch 108. This actuates the switch for cycling the control circuit, as explained hereafter. When the flapper and arm 107 come to rest in the position illustrated, the end of the arm returns to a position out of contact with switch 108. Alternatively, switch 108 may be a reed-type switch mounted in registry with a permanent magnet secured to the end of flapper arm 107 so that a closing inertial movement of the arm carries the magnet by the switch which is thereby actuated without direct contact with the arm. Actuation of switch 108 energizes the control circuit to close gate 83 only after the cow passes clear of the gate and is within the wash stall. This insures that the gate does not prematurely close on the cow.

A switch 111 is provided on wash stall bracket 109 in operating relationship with rear gate extension 99. Switch 111 is conventional and comprises a spring loaded actuating arm adapted to pivot clear of the extension as the gate opens. Upon closing of the gate, extension 99 actuates the switch during the last portion of gate travel. This switch operates the control circuit for initiating the wash cycle, as described hereafter, to direct a spray of wash water onto the cow's udder for a predetermined time.

Figure 6:
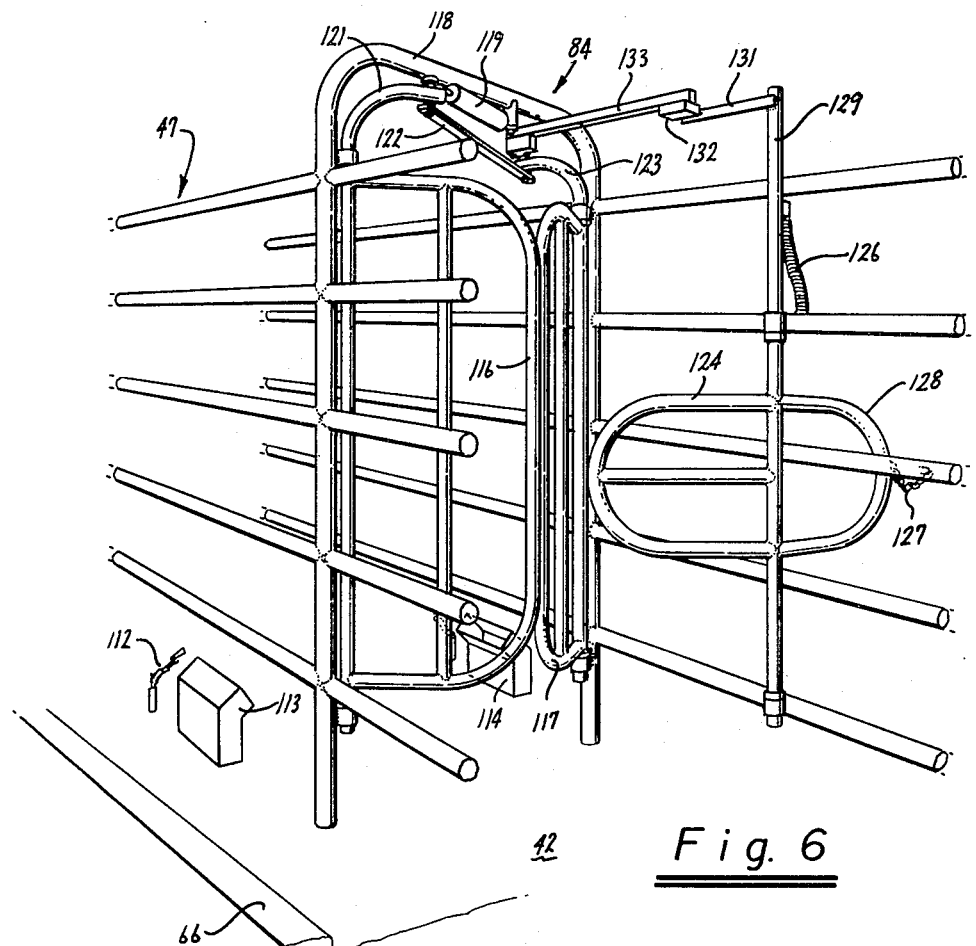
FIG. 6 is a perspective view, partially broken away, of the middle gate between the wash and prep stalls.
Figure 7:
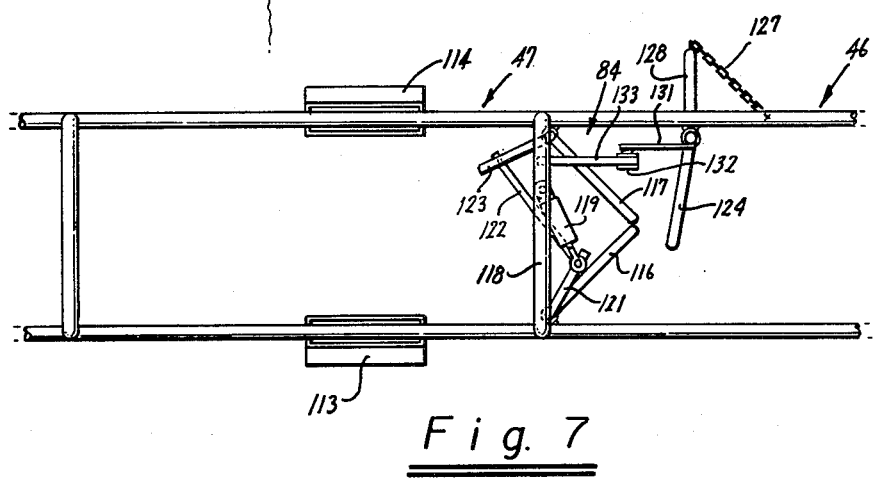
FIG. 7 is a top plan view of FIG. 6.

After the cow is washed, the animal is advanced through middle gate 84 into prep stall 47 of FIGS. 6 and 7. In the prep stall a spray of tempered water at about 90° F. temperature is directed onto the cow's udder by spray nozzle 112 connected with a suitable water supply, not shown. A pair of warm air ducts 113, 114 are provided to direct warm air for drying the cow's udder. This eliminates the need for the operator to use a towel for drying the udder. While the ducts 113, 114 are shown as projecting upwardly through the concrete platform, they could also extend downwardly from an overhead hot air supply, not shown. The combination of tempered water and warm air creates the desired "let down" of the milk into the udder, and also promotes animal contentment for improved milking conditions.

Middle gate 84 comprises a pair of gate arms 116, 117 pivotally mounted to either side of a U-shaped frame member 118. An actuator 119, preferably of the pneumatic type, is provided to move the gate arms between the illustrated closed position and an open position permitting the cow to pass into the prep stall. Actuator 119 is pivotally connected at one end with an upwardly extending arcuate extension 121 of gate arm 116, and a connecting rod 122 interconnects extension 121 with a rearwardly extending arcuate extension 123 of gate arm 117.

A cow-actuated control flapper 124 is provided for actuating the control circuit to automatically close middle gate 84, open rear gate 83, and turn the prep water on for a predetermined time on the order of 30 sec.–1 min. Flapper 124 is pivotally mounted to the side frame of wash stall 46, and a coil spring 126 is provided to yieldably urge the flapper counter-clockwise, as viewed from above. A chain 127 is connected between an outer extension 128 of the flapper and the wash stall frame to limit pivotal movement of the flapper so that it normally projects into the path of cow movement. An upper extension 129 pivots with the flapper and carries with it an operating arm 131. Arm 131 is in operating registry with a switch device 132 mounted on bracket 133 depending from frame member 118.

Figure 12:
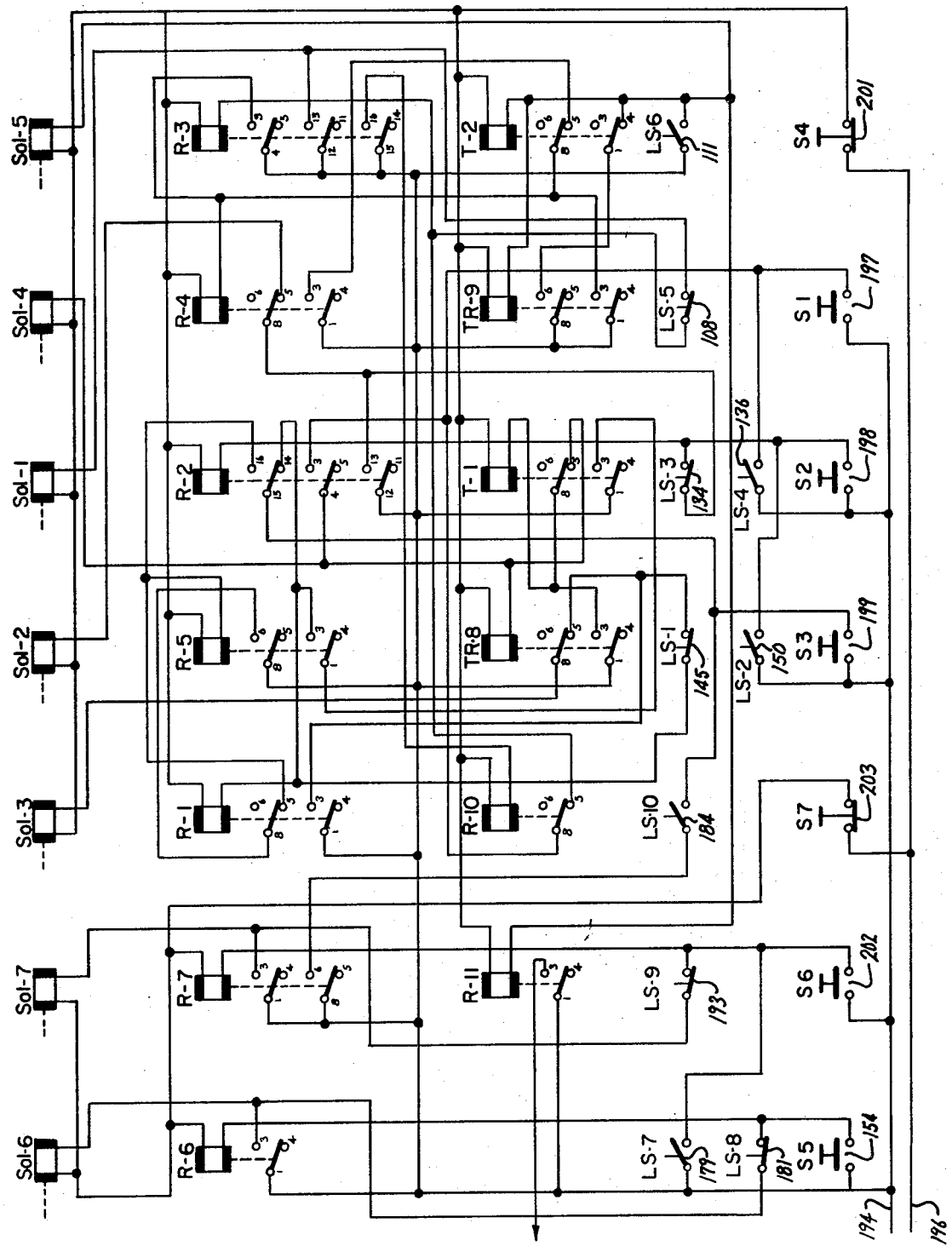

Switch device 132 comprises a pair of limit switches 134, 136 in the circuit of FIG. 12. These switches are actuated after a cow moves past flapper 124 and middle gate 84. As flapper 124 is returned by spring 126 and stopped by chain 127 the inertia of arm 131 carries the arm to an overtravel position in actuating contact with the two limit switches, which are momentarily actuated. Arm 131 is out of contact with the switches when the flapper is at rest, as illustrated. Alternatively, device 132 may comprise a pair of reed-type switches operating responsive to a movement of a magnet carried on the end of arm 131 in the manner described above for switch 108. As explained hereafter, switch 134 is effective to close the middle gate after the cow has completely moved into the prep stall, thus insuring that the gate does not close on the animal's body. At the same time actuation of switch 136 is effective to turn on the tempered prep water and open rear gate 83 for admitting another cow into the wash stall.

Figure 8:
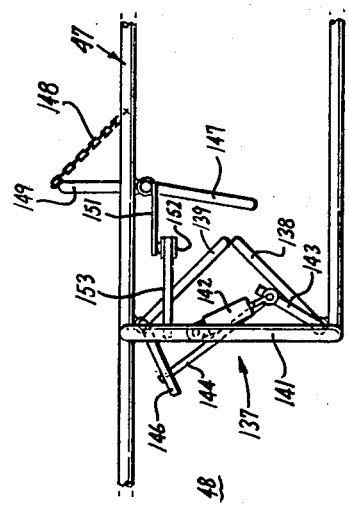
FIG. 8 is a top plan view of the prep stall front exit gate.
Figure 2A:
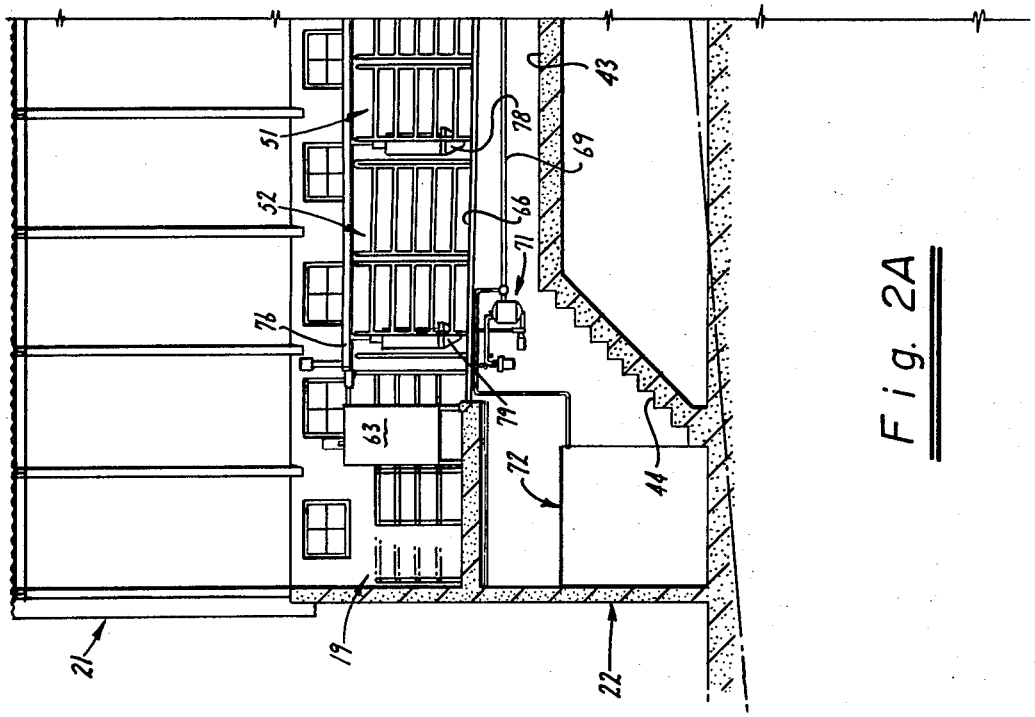

When the prep cycle has been completed and one of the milk stalls is opened to receive a cow for milking, the control circuit opens the prep stall front exit gate 137, illustrated in FIG. 8. Gate 137 is constructed similarly to middle gate 84 and comprises a pair of gate arms 138, 139 pivotally mounted to opposite sides of prep stall 47. A U-shaped frame member 141 supports a gate actuator 142, preferably of the pneumatic type, connected with an upwardly projecting extension 143 of arm 138. A connecting rod 144 interconnects extension 143 with a rearwardly projecting arcuate extension 146 of gate arm 139. Extension and retraction of actuator 142 is effective to open and close the gate arms in conjoint movement permitting the cow to pass from the prep stall into runway 48.

As the cow passes by front gate 137, its body pivots a flapper 147 mounted to a side of the prep stall. A suitable coil spring, not shown, is provided to yieldably urge the flapper counter-clockwise as viewed from above, and a chain 148 connected between flapper extension 149 and the prep stall limits flapper movement to the position illustrated in the path of cow movement. Movement of the cow past flapper 147 and front gate 137 permits the flapper to swing back to its initial position carrying with it actuating arm 151. Arm 151 is mounted in operating registry with a switch device 152 mounted on a bracket 153 depending from frame member 141. Switch device 152 comprises a pair of limit switches 145, 150 of the control circuit of FIG. 12. The overtravel of arm 151 as a result of the arm's inertia when the flapper comes to a stop is effective to momentarily actuate these limit switches. With the flapper at rest the switches are not actuated. Alternatively, switches 145, 150 may comprise the previously described reed-type switches actuatedly responsive to a magnet carried on arm 151. Actuation of switch 145 operates the control circuit to close front gate 137 while actuation of switch 150 is effective to open middle gate 84, in a manner described hereafter. Front gate 137 is closed only after the animal passes completely through the gate, thus insuring that the gate does not close prematurely.

The geometry of the gate arms and flappers of each of the wash stall rear gate 83, middle gate 84, and prep stall front gate 137, is such that the gate opens first letting the animal to move against the associated flapper which is pivoted to overlap the adjacent gate arm. The flapper thus cannot be released for closing of the gate as long as any portion of the animal's body is between the gate arms.

Figure 10:
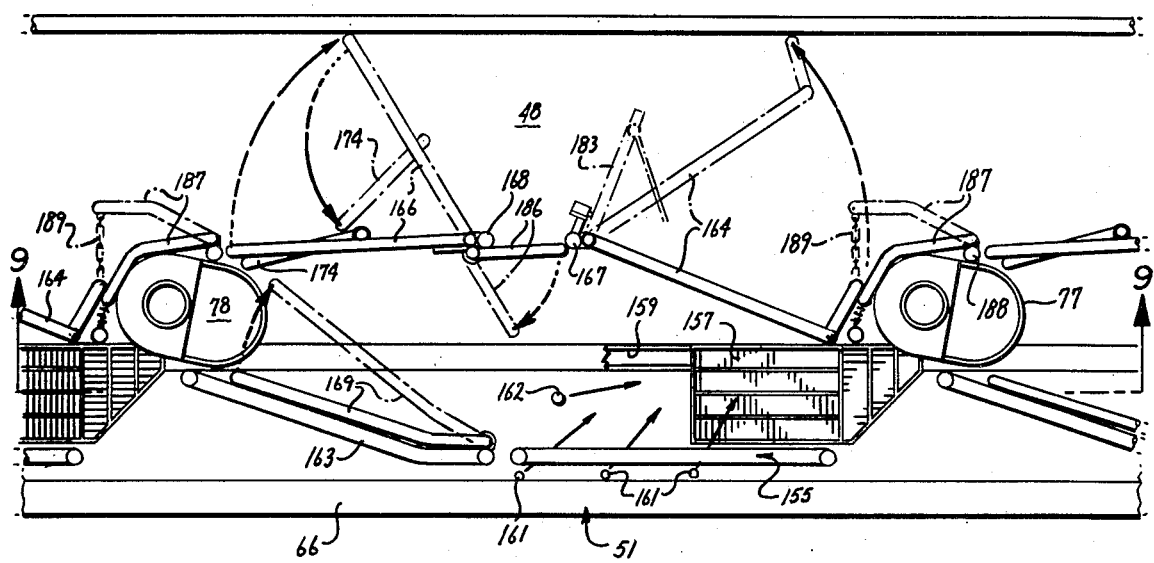
FIG. 10 is a top plan section view taken along the line 10—10 of FIG. 9.
Figure 9:
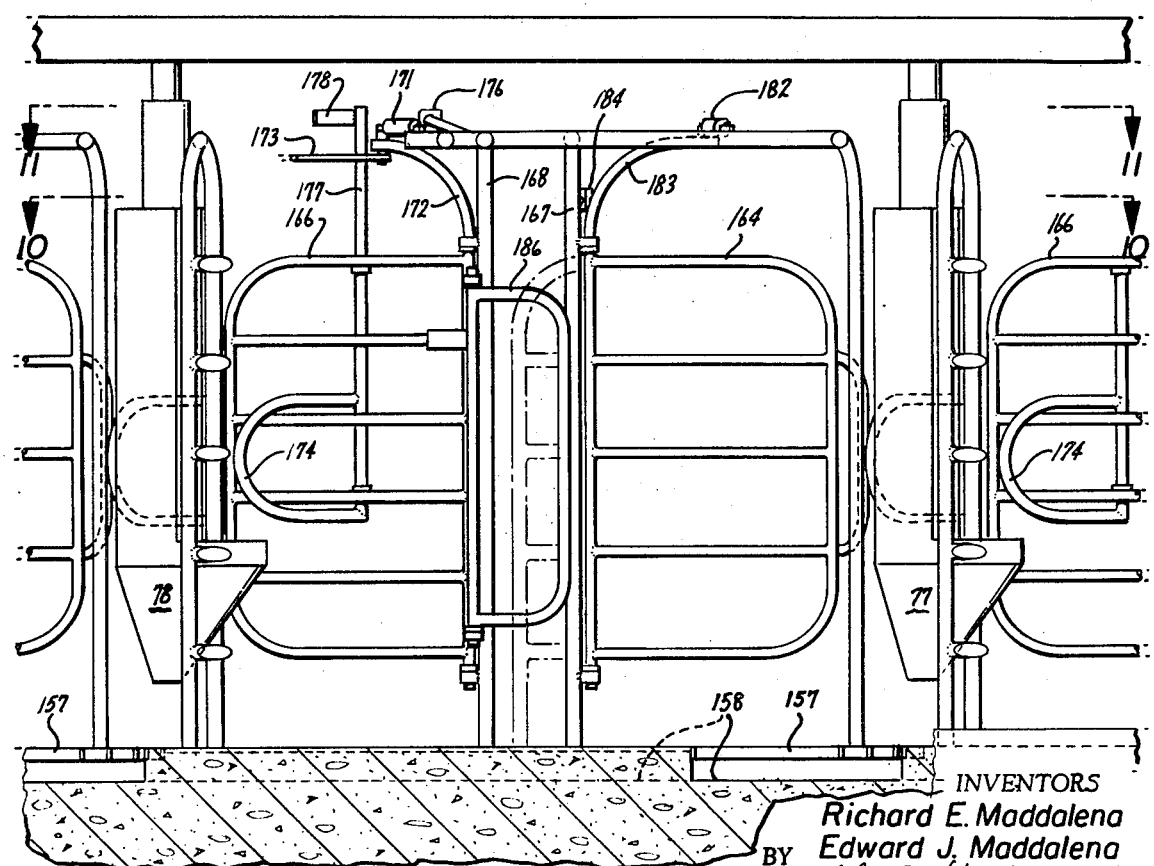
FIG. 9 is a side elevation section view of a typical milk stall taken along the line 9—9 of FIG. 10.

As the cow leaves the prep stall she will move down runway 48 to one of the milk stalls which has been opened by the operator. After milking a cow, the operator will actuate the milk stall front gate button 154 in the control circuit of FIG. 12. This schematic control circuit is illustrated in connection with a typical milk stall 51 of FIGS. 9–11. It is understood that the relays, switches, solenoids, and control buttons for the remaining milk stalls would be arranged in a circuit similar to that of FIG. 12. The control buttons for milk stall 51 are contained in a control box 156 mounted on a side frame 155 adjacent the operator's walkway 43. This provides accessibility to the control button for an operator attaching or removing the milking apparatus on the cow.

Milk stall 51 is of welded pipe construction defining an enclosure for the cow with feed manger 78 at the front and a milking area at the rear. This milking area includes a grate 157 above a cavity 158 leading to a gutter 159. A plurality of spray nozzles 161 are provided to direct water onto the platform after a cow has been milked to wash waste milk or offal through the grate and into the gutter. A sprayer 162 may be provided to spray a sanitizing solution onto the cow's udder.

The enclosure of milk stall 51 is defined by side frame members 155 and 163 on the left-hand side, and rear entry gate 164 and front exit gate 166 on the right-hand side. These gates are pivotally mounted to upstanding U-shaped frame members 167, 168 and are adapted to swing outwardly into the path of runway 48.

With the front and rear gates in closed position milk stall 51 extends along an outwardly and forwardly diverging angle with respect to railing 66 along operator's walkway 43. This configuration positions a cow within the milk stall with her outside rear leg closely positioned adjacent the curbing so that the udder is accessible to the operator for mounting the milking apparatus.

A pusher gate 169 is pivotally mounted to the left side of frame 168 for swinging movement into the stall when the front gate opens. The pusher gate urges the cow's head out of manger 78 and also tends to curve the spine of the animal. This encourages the animal to leave the milk stall by herself without the need of prodding by the operator.

Front gate 166 and pusher gate 169 are opened and closed by means of actuator 171, preferably of the pneumatic type, pivotally mounted above the stall between the frame and forwardly projecting arcuate gate extension 172. A connecting rod 173 interconnects front gate 166 and pusher gate 169 for conjoint swinging movement.

A control flapper 174 is pivotally mounted to front gate 166. Suitable spring means, not shown, are provided to yieldably urge flapper 174 counter-clockwise, as viewed from above, when front gate 166 opens. The flapper then projects into the path of a cow leaving the milk stall. The cow moves against the flapper pivoting it forward, and after she clears the front gate the flapper is returned by the spring means for actuating switch device 176. An upwardly projecting flapper extension 177 carries an operating arm 178 which is positioned to move in operating relationship with switch device 178 when flapper 174 rapidly returns to the broken line position illustrated in FIG. 11. The inertia of operating arm 178 carries it to an overtravel position for operating a pair of limit switches 179, 181 in the switch device and incorporated in the control circuit of FIG. 12. When flapper 174 is at rest the actuating arm is out of operating relationship with the limit switches. Alternatively, these switches may be of the previously described reed-type actuated by a magnet attached to the actuating arm. Actuation of switch 179 is effective to open the rear gate of the milk stall, and actuation of switch 181 is effective to close the front gate of the milk stall.

Milk stall rear gate 164 is operated by actuator 182, preferably of the pneumatic type, pivotally mounted above the stall between the stall frame and a rearwardly projecting arcuate extension 183 of the rear gate. A limit switch 184 mounted on frame member 167 is actuated by extension 183 near the end of its travel as the gate opens. Actuation of switch 184 operates the control circuit to open front gate 137 of prep stall 47, provided that a cow therein has gone through the complete wash and prep cycles.

An auxiliary pusher arm 186 is mounted on the rear of milk stall front gate 166 between frame members 167 and 168. Suitable spring means, not shown, are provided to yieldably constrain arm 186 for swinging movement with the front gate as the latter opens. Gate 186 thus yieldably moves against the side of the cow gently urging her to leave the stall. At the same time, this auxiliary gate when in closed position prevents the cow from pushing her head between frame members 167 and 168.

A rear gate operating flapper 187 is pivotally mounted to frame member 188 on the front of the next preceding milk stall. Flapper 187 is yieldably urged by suitable spring means out into the path of a cow moving from the runway through the opened rear gate of milk stall 51. A chain 189 is provided to limit the extend of outward travel of the flapper. The front end of this flapper extends into registry with the end of rear gate 164 which, when moved to its closed position, carries flapper 187 to its nestled position against manger 77 of the preceding milk stall. An upper extension 191 of flapper 187 carries an arm 192 mounted in operating relationship with switch 193 carried on frame member 188. Switch 193 provides a hold circuit in the control circuit of FIG. 12 which operates to close this rear gate only after the cow passes through the gate and into the milk stall. Switch 193 is adapted for actuation when arm 192 moves to an overtravel position resulting from the inertia of the arm as the cow releases the flapper and it rapidly returns to the broken line position of FIG. 11. Switch 193 is not actuated when the actuating arm and flapper are at rest. Alternatively, this switch may comprise the previously described reed-type switch actuated by a magnet carried on arm 192.

Referring to FIG. 12 the control circuit for the automated dairy barn is illustrated in greater detail. Electrical power for operating the circuit elements is supplied at input lines 194, 196 connected with any suitable electric power source. A plurality of manually operated control buttons are provided to initiate cycling, to recycle any operation as desired, or to override certain of the cycles. The control buttons illustrated in the circuit of FIG. 12 are contained in control box 156 for stall 51, and it is understood that each milk stall would also be provided with similar control buttons for connection in a circuit similar to that of FIG. 12. Accordingly, it will suffice to describe only the controls for one such milk stall.

A manually operated rear gate button 197 is provided to actuate switch S-1 for controlling the rear gate of the wash stall. A button 198 is provided for actuating switch S-2 for controlling the middle gate between the wash and prep stalls. A button 199 is provided to actuate switch S-3 for controlling the front gate of the prep stall. A button 201 is provided to actuate switch S-4 for closing all gates of the wash and prep stalls. A button 154 actuates switch S-5 for opening the front gate of the milk stall. A button 202 is provided to actuate switch S-6 for opening the rear gate of the milk stall. A button 203 is provided to actuate switch S-7 for closing both front and rear gates of the milk stall.

The actuating devices for controlling gate operation and water control functions comprise a series of solenoids in the control circuit. A solenoid Sol-1 is provided to control operation of rear gate 83 of wash stall 46. This solenoid operates a conventional air valve having a spring loaded valve element shifted upon energization of the solenoid to direct air from a source of pressurized air to an end of actuator 96 for opening the gate. With the solenoid de-energized the spring loaded valve element returns to a position directing air to an opposite end of the actuator for returning the gate to its closed position.

A solenoid Sol-2 is provided for controlling operation of middle gate 84 between the wash and prep stalls. This solenoid actuates an air valve of the type described in relation to Sol-1 and is effective, when energized, to direct air to a side of actuator 119 for opening the middle gate, and to direct air to an opposite side of the actuator for closing the gate upon de-energization of the solenoid.

A solenoid Sol-3 is provided for operating front gate 137 of the prep stall. This solenoid actuates an air valve of the type described above effective, upon energization, to operate actuator 142 for opening the front gate, and to close the front gate upon de-energization.

A solenoid Sol-4 is provided to operate a conventional on-off valve in the water line leading to nozzle 112 in the prep stall for controlling the spray of prep water upon energization of the solenoid.

A solenoid Sol-5 is provided to operate a conventional on-off valve in the water line leading to water spray devices 86, 87 in the wash stall.

A solenoid Sol-6 is provided to control operation of front gate 166 on milk stall 51. This solenoid actuates an air valve of the type described above effective, upon energization, to operate actuator 171 for opening the gate, and to close the gate upon de-energization.

A solenoid Sol-7 is provided to control operation of rear gate 164 on the milk stall. This solenoid also actuates an air valve of the type described above effective, upon energization to operate actuator 182 for opening gate 164, and to close the gate upon de-energization.

The control circuit further includes a wash water timer relay TR-9 and wash water timer T-2 for controlling wash stall operations. A wash stall rear gate relay R-3, middle gate relay R-2, and prep stall front gate relay R-1 are provided to control respective rear, middle and front gate cycling. Wash-prep stall memory relays R-4 and R-5 are provided to insure proper cycling through interlock circuits. A prep water control relay R-10, prep water timer relay TR-8, and prep water timer T-1 are provided to control operation of the prep cycle. Milk stall front gate relay R-6 and rear gate relay R-7 are provided to control respective front and rear gate operation in the milk stall. A pump control relay R-11 may be provided for use with an alternative auxiliary water pump, not shown, for supplying water to the wash stall sprinklers.

In operation, assume that all stalls are empty and that it is desired to move the first cow from the holding station into the wash stall. The operator depresses button 197 to close S-1 which establishes a circuit through contacts 8-5 of R-10 for energizing relay R-3. This relay establishes a circuit from power line 194 through contacts 121 13 of R-3 to energize Sol-1 for 12-the rear gate of the wash stall. At the same time a hold circuit is established through contacts 12-13 of R-3 and limit switch 108 to the coil of R-3.

As the cow moves past open rear gate 83 on its way into the stall, flapper 101 is released to actuate limit switch 108. This opens the hold circuit to the coil of R-3 and de-energizes Sol-1. This solenoid thereby actuates its associated air valve connected with actuator 96 for closing the rear gate with the cow in the wash stall. Closing of the rear gate actuates limit switch 111 establishing a circuit from power line 194 to energize TR-9 and T-2. A hold circuit for relay TR-2 is established through contacts 6-8 of TR-9 and contacts 1-4 of TR-2. Contacts 6-8 of TR-9 and 1-4 of TR-2 also establish a circuit from the power line to Sol-5 which turns on the valve for the wash water sprinklers. Pump control relay R-11 is in parallel connection with this circuit, and thus is energized to establish a circuit through its contacts 1-3 to the water pump relay, not shown, for any desired auxiliary water pump providing additional water pressure for the wash stall sprinklers.

Timer T-2 may be set to operate within a predetermined time in the range of 30 sec.-1 min. Operation of T-2 after this time period opens its contacts 1-4 to de-energize its hold circuit, de-energize Sol-5, and de-energize R-11 for shutting off water to the sprinklers.

After the wash cycle the operator depresses middle gate button 198 to actuate S-2 for moving the cow to the prep stall. S-2 establishes a circuit from power line 194 to energize middle gate relay R-2. R-2 establishes a circuit from the power line through contacts 12-13 of R-2 and contacts 8-5 of memory relay R-4 to Sol-2. A hold circuit for R-2 is established through contacts 12-13 of R-2 and limit switch 134. Actuation of Sol-2 operates its associated air valve for operating actuator 119 to open middle gate 84.

Memory relay R–4 provides an interlock circuit which allows the middle gate to open only if the wash stall rear gate is closed and if the wash cycle is finished. Thus, a circuit cannot be established to Sol–1 if R–4 is energized to open its contacts 8–5. R–4 is energized either upon energization of rear gate relay R–3 through its contacts 3–4, or R–4 may be energized if wash water timer relay TR–9 is energized through its contacts 1–3.

With the middle gate open the cow walks forward into the prep stall urging control flapper 124 to the side. As the cow clears the middle gate this flapper is released to energize limit switches 134 and 136. Switch 136 is effective to trigger opening of the rear gate and also turn on the prep water. This switch establishes a circuit from the power line through the closed contacts 3–4 of R–2 to energize prep water timer relay TR–8. A hold circuit for TR–8 is established from the power line through contacts 1–3 of TR–8 and contacts 8–5 of T–1. Timer T–1 is energized by a circuit established through contacts 1–3 and TR–8, and this timer is set to operate after a predetermined time within the range of 30 sec.–1 min. The prep water is turned on by operation of the water valve actuated by Sol–4 which in turn is energized by a circuit established through contacts 1–3 of TR–8 and contacts 8–5 of T–1.

The circuit provides an interlock which permits the prep water to turn on only if the middle gate is operating. Thus, TR–8 operates only if contacts 3–4 of R–2 are closed by operation of middle gate relay R–2.

After the predetermined time, the prep water timer T–1 operates to open the circuit through its contacts 8–5 and de-energize Sol–4. At the same time the hold circuit to TR–8 is opened de-energizing this relay and this in turn opens the hold circuit to T–1.

At the same time the closing of limit switch 136 establishes a circuit through contacts 8–5 of prep water control relay R–10 to actuate rear gear relay R–3. R–3 establishes a hold circuit for itself through its contacts 12–13 and limit switch 108, while at the same time energizing rear gate solenoid Sol–1 through contacts 12–13 of R–3. The rear gate of the wash stall then opens to admit the next cow for washing in a cycle similar to that previously described.

After completion of the prep cycle, the operator depresses rear gate button 202 of the selected milk stall in which it is desired that the cow be milked. This closes S–6 which establishes a circuit to energize milk stall rear gate relay R–7. R–7 establishes a circuit from the power line through contacts 1–3 of R–7 to energize Sol–7 which in turn operates to open the selected milk stall rear gate 164. Contacts 1–3 of R–7 also established a hold circuit through the normally closed limit switch 193 to hold R–7 energized.

Limit switch 184 is closed by the action of rear gate 164 moving to open position. Switch 184 establishes a circuit from the power line through contacts 8–6 of R–7 and contacts 14–15 of middle gate relay R–2 to energize front gate relay R–1. Relay R–1 in turn establishes a circuit through contacts 1–3 of R–1 and contacts 5–8 of TR–8 to energize Sol–1. This solenoid in turn opens the front gate of the prep stall permitting the cow to walk down the runway and through the open rear gate into the milk stall.

A memory interlock circuit is provided to insure that the prep stall front gate does not open until the prep cycle is completed. Thus, Sol–1 can only be energized if contacts 5–8 of prep water timer relay TR–8 are closed. Also, an interlock is provided preventing the prep stall front gate from opening if the middle gate is open. Thus, R–1 is energized only if contacts 14–15 of middle gate relay R–2 are closed.

As the cow passes by front gate 137 of the prep stall, flapper 147 is released to actuate limit switches 145 and 150. Switch 145 opens the hold circuit to R–1 which in turn opens the circuit through its contacts 1–3 to de-energize Sol–1 for returning the prep stall front gate to closed position. Switch 150 closes to establish a circuit from the power line to actuate R–2 which in turn establishes a circuit through its contacts 12–13 and contacts 8–5 of R–4 to energize Sol–2 for opening middle gate 84, provided the wash stall rear gate is closed and the wash cycle is completed, as described above. The cow in the wash stall then walks into the prep stall for its prep cycle, which is repeated as described above.

As the cow which has left the prep stall passes from the runway into the open rear gate of the milk stall control flapper 187 is first moved aside and then released as the cow's body clears the rear gate. The flapper then actuates limit switch 193 which opens the hold circuit for rear gate relay R–7 which in turn opens the circuit to Sol–7 so that the rear gate returns to its closed position.

With the cow locked within milk stall 51, the operator attaches the milking machine for the milking operation. He then moves to the remaining milk stalls to open the rear gates thereof for cycling the control circuit in the manner previously described for moving a washed and preped cow into the stall. Assuming that all stalls have been filled, and that the milking operation in one of the stalls is completed, an operator merely depresses milk stall front gate button 154 to trigger the control circuit for releasing the cow from this stall. The control circuit then automatically cycles for advancing a cow from a prep stall into the open milk stall, advancing a cow from the wash stall into the prep stall, and advancing a cow from the holding station to the wash stall.

Operation of button 154 closes S–5 which establishes a circuit to energize front gate relay R–6. This relay establishes a circuit from the power line through contacts 1–3 of R–6 to energize Sol–6 which in turn operates actuator 171 for opening front gate 166. A hold circuit is established through contacts 1–3 of R–6 and limit switch 181 to relay R–6. With the front gate open the cow is urged to leave the milk stall, and as the animal clears control flapper 174, the flapper returns and opens switch 181. This switch opens the hold circuit to R–6 which in turn opens the circuit to Sol–6 so that actuator 171 operates to close the front gate. The returning movement of flapper 174 also closes switch 179 which establishes a circuit to energize milk stall rear gate relay R–7. This relay establishes a circuit through its contacts 1–3 to energize Sol–7 for opening the rear gate. Opening of the rear gate in turn actuates switch 184 for operating prep stall front gate relay R–1 as described above. If the prep cycle has been completed the prep stall front gate will open to permit the cow to walk down the runway and enter the open rear gate of the milk stall, which closes in the manner described above.

The control circuit also provides a memory function to keep all milk stalls loaded with "unmilked" cows. For example, should the operator let out the cows from two milk stalls in the same milking line, the wash and prep stalls will automatically process two additional cows which are in turn released to these empty milk stalls. The only action required by the operator is in releasing the milked cows from the milk stalls. Thus, as these cows leave their milk stalls the respective relays R-7 associated with each such stall are energized to open the rear gates, which in turn close the respective limit switches 184. These switches establish circuits to operate R-1 for opening the prep stall front gate if a cow therein has completed the wash and prep cycles, i.e., R-1 is energized only if contacts 14-15 of middle gate relay R-2 are closed, and Sol-1 is energized only if contacts 5-8 of prep water timer TR-8 are closed. As a cow leaves the prep stall and enters the first milk stall the latter's rear gate will close, and this opens its associated switch 184. The limit switch 184 of the remaining open milk stall then cycles the circuit in the same manner to advance another washed and preped cow from the prep stall.

Means are provided to quickly close all gates on the milk stalls for any reason, such as if it is desired to recycle any of the control functions. To do this the operator depresses the milk stall closing button 203 to open S-7 which immediately de-energizes Sol-6 for closing the front gate, and de-energizes Sol-7 for closing the rear gate.

Means are also provided to immediately close all gates of the wash and prep stalls and turn off the prep and wash water supply should it be desired to re-cycle the wash-prep circuits for any reason. Thus, the operator may depress closing button 201 which opens S-4 to immediately de-energize Sol-1 to close the wash stall rear gate, de-energize Sol-2 to close the middle gate, de-energize Sol-3 to close the prep stall front gate, de-energize Sol-4 to turn off the prep water, and de-energize Sol-5 to turn off the wash water.

While the foregoing embodiments are at present considered to be preferred, it will be understood that numerous variations and modifications may be made therein by those skilled in the art and it is intended to cover in the appended claims all such variations and modifications as fall within the true spirit and scope of the invention.

We claim:

1. Milk stall apparatus for use in a dairy barn for milking cows, the apparatus including the combination of: an enclosure for restricting movement of the cow as it is milked, the enclosure defined by a feed manger at one end thereof, and a milking area at the opposite end with a pair of spaced apart sides extending between the manger and milking area, a rear entry gate in one of said sides adapted to open for directing a cow into the milk stall, a front exit gate on one of said sides adapted to open to admit a cow from the milk stall, control means to open and close the front and rear gates, pusher gate means pivotally mounted on an enclosure side opposite said front gate and adjacent the manger, and means to move the pusher gate means into the enclosure to push the cow's head from the manger responsive to opening of said front gate whereby the cow is urged to exit from the milk stall.

2. The apparatus of claim 1 wherein the front gate and pusher gate are pivotally mounted on respective enclosure sides with their free ends extending forwardly adjacent the manger, and means interconnecting the front gate and pusher gate for conjoint swinging movement urging the cow's body into a slight curvature during opening of the front gate for encouraging the cow to exit from the enclosure.

3. The apparatus of claim 1 and further including an elevated floor for supporting the enclosure whereby the udder of a cow within the enclosure is at a convenient height accessible to a milking operator, and an operator walkway along a side of said enclosure opposite the front and rear gates, the longitudinal axis of the enclosure positioned at an acute angle with respect to the walkway so that the feed manger is spaced from the walkway to position a cow within the enclosure with its udder adjacent the walkway for accessibility to the operator.

4. The apparatus of claim 1 wherein the front gate is pivotally mounted at its rear edge to a side of the enclosure with its front edge extending, when closed, to the feed manger, an auxiliary arm mounted adjacent the rear edge of said front gate on said one side of the enclosure, and means holding said auxiliary arm for pivotal movement with said front gate whereby opening of the front gate presses the auxiliary arm into the side of a cow within the enclosure for urging the cow to exit from the milk stall.

* * * * *